E. K. HOOD.
SHAKER.
APPLICATION FILED MAR. 12, 1909.
974,968.
Patented Nov. 8, 1910.
2 SHEETS—SHEET 1.
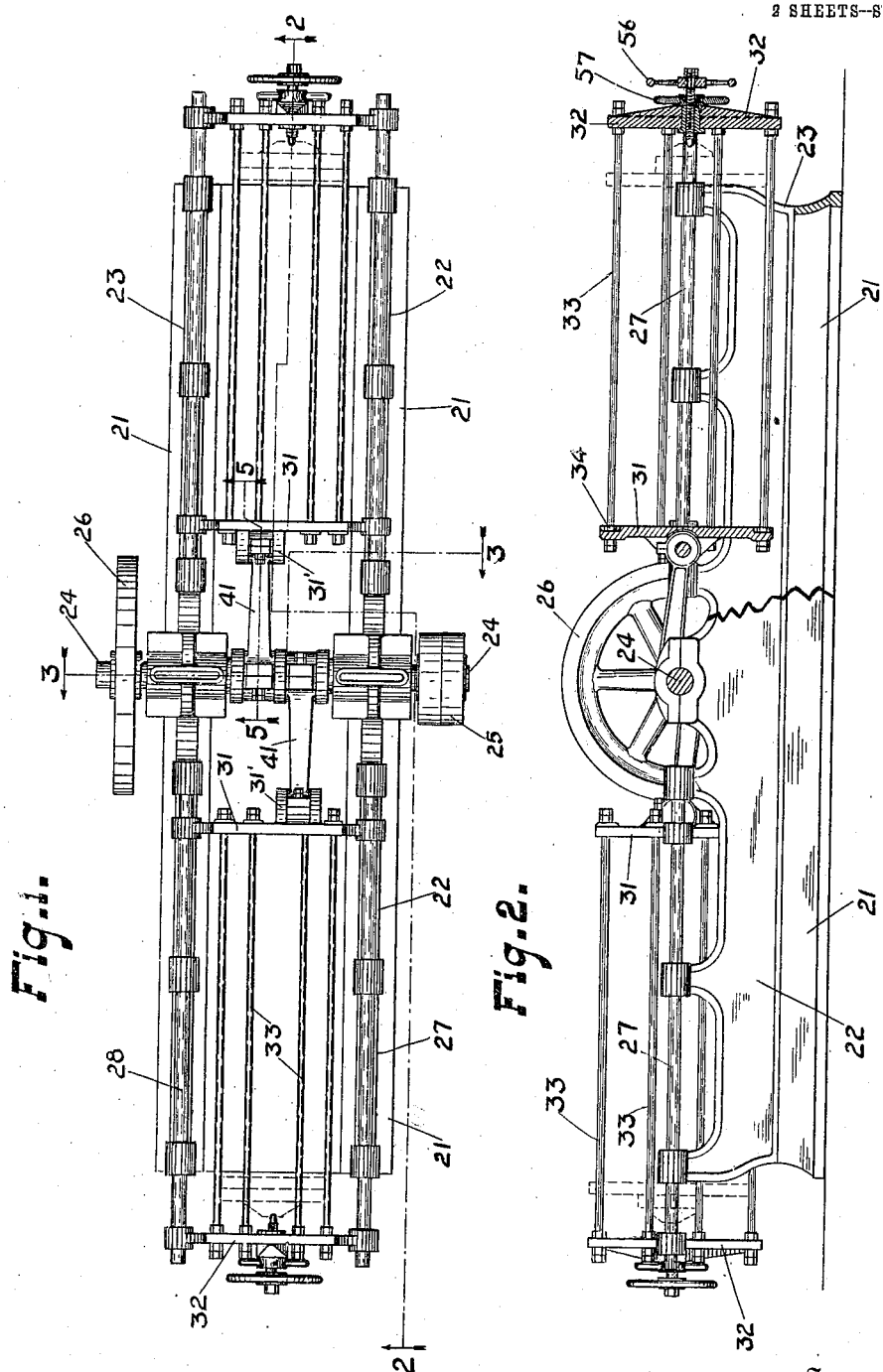
Witnesses
Walter Troemel.
Thomas W. McMeans
Inventor
Ernest K. Hood.
By Bradford & Hood,
Attorneys.

E. K. HOOD.
SHAKER.
APPLICATION FILED MAR. 12, 1909.
974,968.
Patented Nov. 8, 1910.
2 SHEETS—SHEET 2.
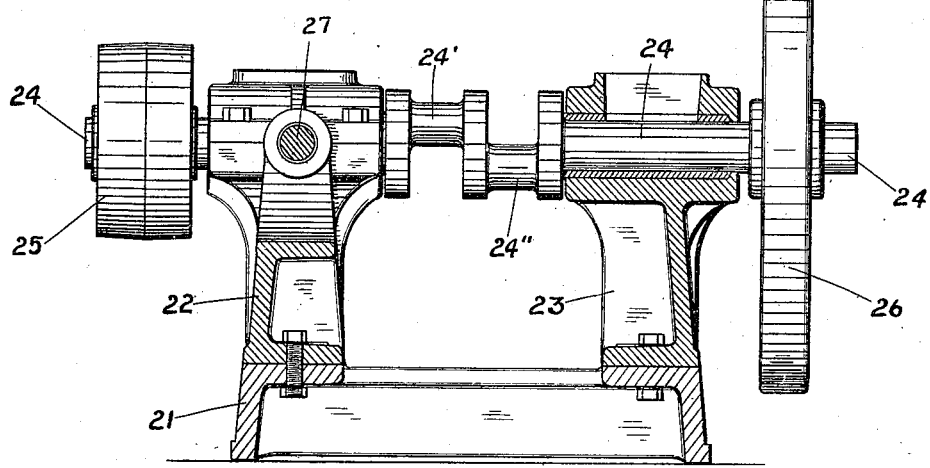
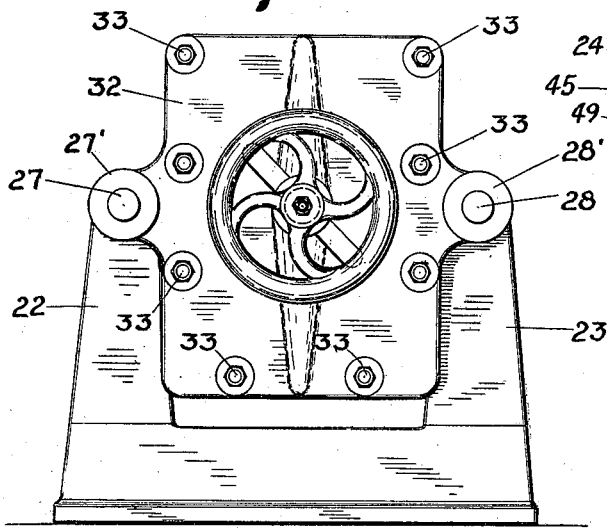
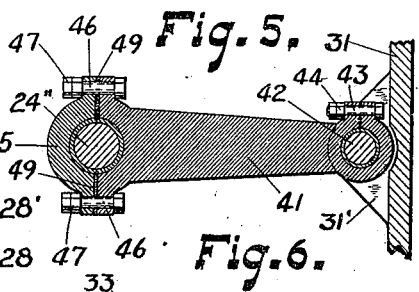
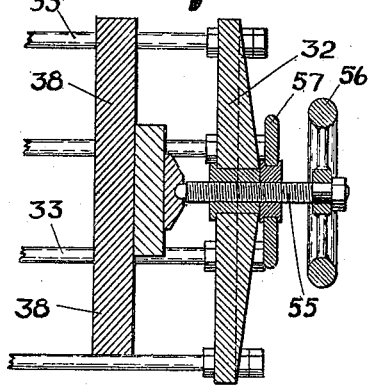
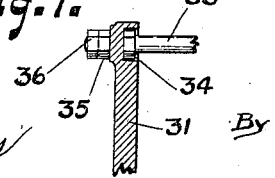
Witnesses
Walter Troemel.
Thomas W. McMeans
Inventor
Ernest K. Hood,
By Bradford & Hood,
Attorneys.
THE NORRIS PETERS CO., WASHINGTON, D. C.

UNITED STATES PATENT OFFICE.

ERNEST K. HOOD, OF INDIANAPOLIS, INDIANA, ASSIGNOR TO CLIMAX MACHINERY COMPANY, OF INDIANAPOLIS, INDIANA, A CORPORATION OF INDIANA.

SHAKER.

974,968.

Specification of Letters Patent. Patented Nov. 8, 1910.

Application filed March 12, 1909. Serial No. 482,937.

*To all whom it may concern:*

Be it known that I, ERNEST K. HOOD, a citizen of the United States, residing at Indianapolis, in the county of Marion and State of Indiana, have invented certain new and useful Improvements in Shakers, of which the following is a specification.

In the manufacture of condensed milk, it is necessary, after the " processing " has been completed, to subject the milk to a violent agitation in order to reduce it to the smooth creamy condition which commercial conditions require; as, in such processing operations, the product becomes lumpy and uneven. Other food products are also benefited by such agitation or shaking.

The object of my present invention is to produce a machine by which this work may be quickly and efficiently performed.

Referring to the accompanying drawings, which are made a part hereof, and on which similar reference characters indicate similar parts, Figure 1 is a top or plan view of a machine of the character in question embodying my present invention; Fig. 2 a view partly in side elevation and partly in longitudinal vertical section as seen when looking in the direction of the arrows in the broken line 2 2 in Fig. 1; Fig. 3 a transverse vertical sectional view as seen when looking in the direction indicated by the arrows from the broken line 3 3 in Fig. 1; Fig. 4 an end elevation; Fig. 5 a detail sectional view as seen when looking in the direction indicated by the arrows from the broken line 5 5 in Fig. 1; Fig. 6 a view similar to a portion of Fig. 2, but on an enlarged scale, and showing the follower plate in full lines, and Fig. 7 a detail sectional view also similar to a portion of Fig. 2, but on an enlarged scale.

In this machine, upon a heavy base 21 I mount two side members 22 and 23, and these constitute the frame of the machine. Centrally, in this frame, I provide large bearings, and in these bearings I mount a crank shaft 24 having two opposed cranks 24′ and 24″. Upon one end of this shaft I place a driving pulley 25, and upon the other end a fly wheel 26. Also, in the said frame sides 22 and 23, I secure rods 27 and 28 which form slides upon which the cages containing the material to be treated are mounted. As best shown in Figs. 1 and 2, these rods 27 and 28 are each carried by three upwardly extending arms on the sides 22 and 23. There are two of these rods or slides at each end of the machine—there being two cages of corresponding form and character.

Each of the cages in question consists of two end plates or heads 31 and 32, and a suitable number of side and bottom rods 33. In the construction shown there are eight of these rods 33 in each cage—three at each side, and two at the bottom,—the arrangement of which is best shown in Fig. 4. These rods are secured to the heads 31 and 32 by means of nuts on each side. It is desirable that the inner face of the heads 31 should be non-obstructed; and, therefore, as best shown in Figs. 2 and 7, I provide countersunk openings to receive the inner nuts 34, while the outer nuts 35 and 36 are carried by the outer ends of the rods on the outside. This makes a very strong and comparatively inexpensive cage, capable of receiving and carrying the cases of produce to be treated.

The heads 31 and 32 are provided with extensions 27′ and 28′, which, respectively, extend over and form bearings upon the rods or slides 27 and 28. Said rods being fixed in the frame, these extensions form bearings which move on said rods, as the cages are thrust back and forth. In the outer heads 32 of these cages I place clamping screws 55 having hand wheels 56 and jam nuts 57. These clamping screws 35 operate follower boards or plates 38, between which and the heads 31 the cases of material to be treated are placed.

Extending between the crank shaft 24 and the heads 31 are connecting rods 41. At one end each connecting rod has a bearing which surrounds the corresponding wrist on shaft 24, and, at the other end, is provided with another bearing which surrounds a wrist-pin 42 mounted in ears 31′ on head 31. These bearings engaging wrist-pins 42 are split at one side, and are provided with take-up bolts 43 having jam-nuts 44 thereon. In a heavy machine of this character, having a rapid motion, it is highly necessary that these bearings have a very accurate adjustment. The splits in these bearings and the take-up bolts referred to, afford a means for accurately effecting this adjustment. The bearings surrounding the cranks of crank-shaft 24 are also split, and the cap portions 45 are secured to the main portions by bolts 46 bearing jam-nuts 47. Interposed between the parts 41 and 45 are liners or shims 49, which, when the bearings become worn can be taken out and dressed down, after which, by means of the bolts 46, the bearings can be restored to their original degree of tightness. Sleeves or bushings of a suitable bearing metal preferably surround and are in immediate contact with the wrist and crank pins, as shown in Fig. 5.

Having thus fully described my said invention, what I claim as new, and desire to secure by Letters Patent, is,

1. The combination, in a shaker, of a frame, a double crank shaft mounted centrally in said frame, slides at each side of said crank shaft carried by said frame, cages mounted on said slides, connecting rods connecting the heads of said cages with the cranks of said crank shaft, each connecting rod being provided with split bearings which engage the wrist pin, liners in said bearing capable of being removed and adjusted, and suitable take-up bolts for adjusting said bearings.

2. The combination, in a shaker, of a frame, a double crank shaft mounted centrally in said frame, slides at each side of said crank shaft carried by said frame, cages mounted on said slides, connecting rods connecting the heads of said cages with the cranks of said crank shaft, each connecting rod being provided with split bearings which engage the wrist pin, and suitable take-up bolts for adjusting said bearings.

3. The combination, in a shaker, of a frame, a crank shaft arranged centrally therein having two central opposed cranks, slides carried by said frame at each side of said crank shaft, a cage mounted on said slides at each side of said crank shaft, each cage being composed of two heads and rods connecting said heads, the means of connecting the heads and rods being a series of nuts, and one of each of said heads having countersunk openings surrounding the rods to receive the nuts on the inner side of the head, whereby projections on the surface of the head are avoided.

4. The combination, in a shaker, of a frame, a shaft mounted centrally in said frame and provided with two cranks opposed to each other, slides carried by said frame at each side of said crank shaft, cages each composed of two heads a series of bottom rods and two series of side rods mounted and adapted to reciprocally move said slides, pitmen connecting the cranks with the heads of the cages, and clamping devices secured in the opposite heads of the cages for clamping the cases of material to be treated therein.

In witness whereof, I, have hereunto set my hand and seal at Indianapolis, Indiana, this eighth day of March, A. D. one thousand nine hundred and nine.

ERNEST K. HOOD. [L. S.]

Witnesses:
CHESTER BRADFORD,
THOMAS W. MCMEANS.